(12) United States Patent
Sachs

(10) Patent No.: US 10,924,925 B2
(45) Date of Patent: Feb. 16, 2021

(54) SECURE PAIRING FOR DEVICES WITH NEAR FIELD COMMUNICATION TAGS EQUIPPED WITH AUTHENTICATION

(71) Applicant: MOTOROLA SOLUTIONS, INC, Chicago, IL (US)

(72) Inventor: Daniel Grobe Sachs, Elmhurst, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 356 days.

(21) Appl. No.: 16/115,977

(22) Filed: Aug. 29, 2018

(65) Prior Publication Data

US 2020/0077259 A1 Mar. 5, 2020

(51) Int. Cl.
| | |
|---|---|
| *H04W 12/06* | (2021.01) |
| *H04W 4/80* | (2018.01) |
| *H04L 9/32* | (2006.01) |
| *H04L 29/06* | (2006.01) |

(52) U.S. Cl.
CPC .......... *H04W 12/06* (2013.01); *H04L 9/3271* (2013.01); *H04L 63/0869* (2013.01); *H04W 4/80* (2018.02)

(58) Field of Classification Search
CPC ...... H04W 12/06; H04W 4/80; H04L 9/3271; H04L 63/0869
See application file for complete search history.

(56) References Cited

U.S. PATENT DOCUMENTS

| | | | |
|---|---|---|---|
| 8,432,261 B2 | 4/2013 | Talty et al. | |
| 8,666,313 B2 | 3/2014 | Preston et al. | |
| 9,277,407 B2 | 3/2016 | Blanco et al. | |
| 2003/0172271 A1* | 9/2003 | Silvester | H04W 12/003 713/170 |
| 2011/0028091 A1 | 2/2011 | Higgins et al. | |
| 2014/0273845 A1* | 9/2014 | Russell | H04W 12/003 455/41.2 |
| 2014/0282974 A1* | 9/2014 | Maher | H04L 9/3271 726/7 |
| 2015/0222517 A1 | 8/2015 | McLaughlin et al. | |

(Continued)

OTHER PUBLICATIONS

NFC Forum Bluetooth Special Interest Group, "Bluetooth Secure Simple Pairing Using NFC", Application Document, NFC Forum, NFCForum-AD-BTSSP_1_1, Jan. 9, 2014, all pages.

(Continued)

*Primary Examiner* — Kristine L Kincaid
*Assistant Examiner* — Alexander R Lapian

(57) ABSTRACT

Techniques for secure pairing for devices with Near Field Communications (NFC) tags equipped with authentication are provided. In one aspect a device with a passive near field communication tag including a private key for authentication is provided. The device may send a challenge request to a host device including an active NFC tag via a wireless communication protocol. The challenge request may be combined with a shared secret value known to the device and the host device to create a challenge request seed. The challenge request seed may be combined with the private key to compute a verified challenge request response. A challenge request response may be received from the host device via the wireless communication protocol. The challenge request response and verified challenge request response may be compared to authenticate the host device to the device.

20 Claims, 4 Drawing Sheets

(56) References Cited

U.S. PATENT DOCUMENTS

2016/0078215 A1* 3/2016 Robshaw ............... H04L 63/18
340/10.42
2016/0132704 A1   5/2016 Engels et al.
2016/0316364 A1* 10/2016 Blanco .............. H04W 12/0401
2019/0103980 A1*  4/2019 Savry ................ H04W 12/0023
2020/0286069 A1*  9/2020 Pearson .......... H04W 12/00503

OTHER PUBLICATIONS

The International Search Report and the Written Opinion, corresponding patent application No. PCT/US2019/046293 filed Aug. 13, 2019, dated Oct. 10, 2019, all pages.

* cited by examiner

SECURE PAIRING FOR DEVICES WITH NEAR FIELD COMMUNICATION TAGS EQUIPPED WITH AUTHENTICATION

BACKGROUND

Host devices may wirelessly pair with accessory devices over readily available wireless connection protocols. For example, a cellular telephone acting as a host device may utilize the Bluetooth wireless connection protocol to connect with a wireless headset or a set of wireless speakers. In a public safety context, a first responder (e.g. police, fire, medical services) personnel may be equipped with a communication host device, such as a land mobile radio (LMR) walkie talkie. That LMR device may then pair with accessories, such as a wireless remote speaker/microphone or wireless body worn camera.

In many contexts, particularly in a public safety context, it may be desirable to have some form of authentication for accessory devices that are pairing with host devices to ensure that the devices are properly authenticated. For example, it would be undesirable for a police officer to think he is pairing his walkie talkie to his body worn camera when in fact he is actually pairing with a device controlled by a malicious third party.

In one mechanism for secure pairing, an accessory device includes a processor that is coupled with appropriate hardware to establish a wireless connection (e.g. Bluetooth hardware). The processor may also be coupled to a near field communication (NFC) tag, where a near field tag is a device designed to be read or written over an RF coupling that falls of rapidly over distance so that communication can occur only over short distance. The NFC tag may be such that the processor is able to program the NFC tag with data that can then be read by NFC tag readers. A host device with a NFC tag reader may read the NFC tag on the accessory device to obtain a connection address (e.g. Bluetooth address). The host device may then connect to the accessory device via the wireless communication protocol.

The processor of the accessory device may then program the NFC tag with some type of "challenge" value. This is possible, because the processor of the accessory tag is electrically coupled to the NFC tag. The host device may then read the "challenge" value via its NFC tag reader and send the value to the accessory device via the wireless communication protocol. The processor of the accessory device can compare the received challenge value to the challenge value that was written to the NFC tag, and if they are the same, it can be confirmed that the host device is communicating with an accessory device that has a processor electrically coupled to the NFC tag. This form of authentication is called "OOB" or "Out Of Band" authentication, because it operates on a secondary link, rather than the primary ("In Band") radio link.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
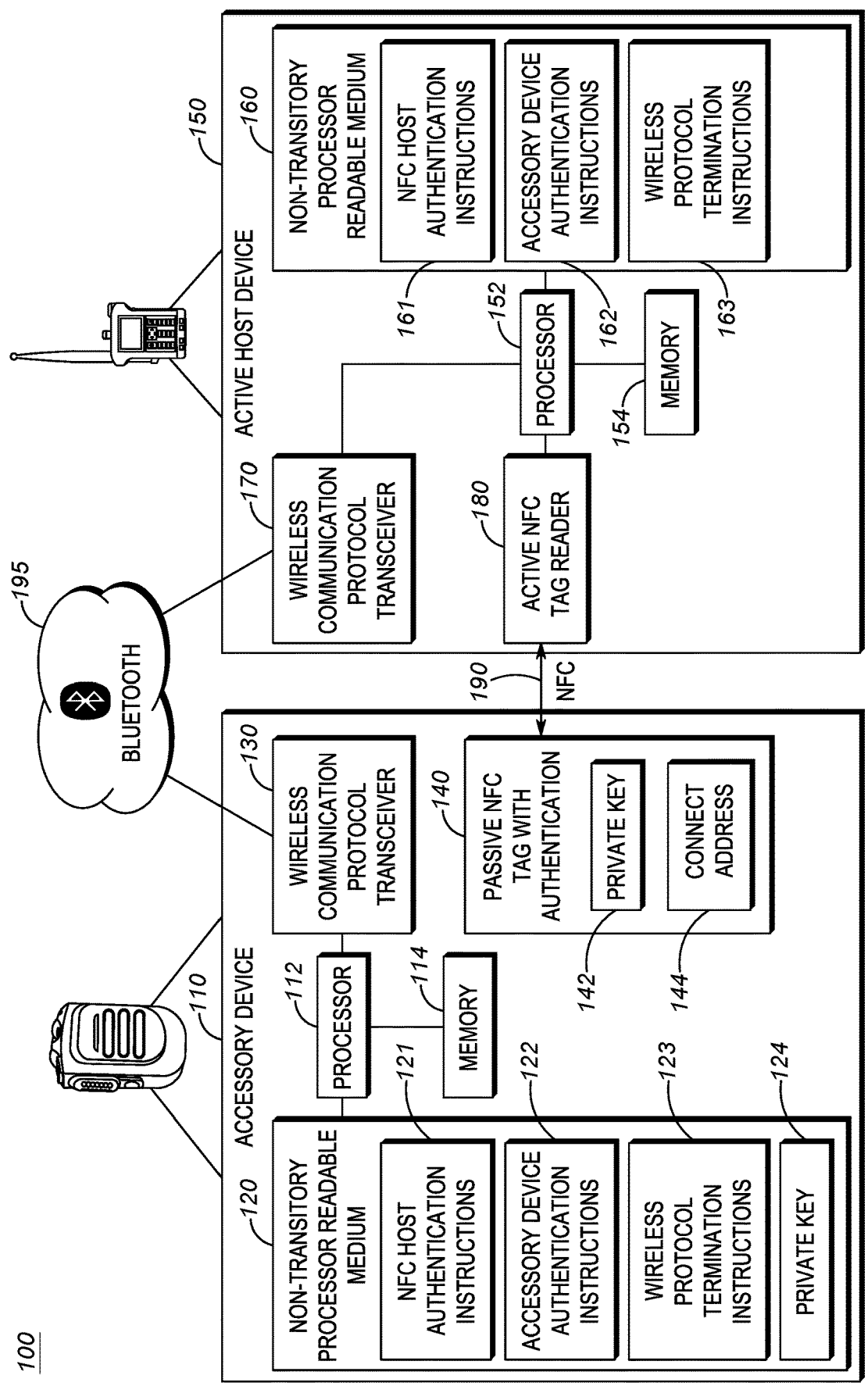
FIG. 1 is an example of a high level system diagram for a system implementing the secure pairing techniques described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The authentication technique described above is reliant on the fact that the processor of the accessory device is in electrical communication with the NFC tag associated with the accessory device and can program the NFC tag with data (e.g. the challenge) to be sent to host devices. Such a solution suffers from several shortcomings. One such shortcoming is that providing an electrical connection between the processor and the NFC tag may raise the cost of the accessory device. Another shortcoming is such a connection would need to be designed into the accessory device from the start, and as such, the authentication feature cannot be retrofit onto existing accessory devices without requiring electrical and/or physical changes to the accessory device.

Furthermore, absent additional measures, the type of pairing described above is subject to a Man-In-The-Middle attack where a third device inserts itself between the accessory device and the host device such that it can read and change data being transmitted between the two devices.

The devices and methods described herein provide for an authentication mechanism that utilizes an NFC tag on an accessory device that does not require an electrical connection to the processor of the accessory device. The techniques described herein can be retrofit onto existing accessory devices without requiring electrical and/or physical changes to be made to the accessory device. The techniques described herein can be used to prevent Man in the Middle attacks and can provide the security advantages of an "Out of Band" authentication without an electrical connection between the accessory processor and the accessory NFC tag. A more detailed description of the secure pairing techniques can be found below and in conjunction with the appended figures.

A method for secure pairing for devices with NFC tags equipped with authentication is provided. An accessory device including a processor is provided. The accessory device includes a passive near field communication (NFC) tag providing authentication and containing an address for connecting to the accessory device via a wireless communication protocol. The passive NFC tag includes a private key known to the NFC passive tag and the processor. The passive NFC tag is not electrically coupled to the processor. The method includes sending a challenge request to an active NFC host device connected to the accessory device via the wireless communication protocol. The method also includes combining the challenge request with a shared secret value known to the processor and the active NFC host device using a one-way function to compute a challenge request seed. In addition, the method includes combining the challenge request seed with the private key to compute a verified challenge request response. The method also includes receiving a challenge request response from the active NFC host device via the wireless communications protocol. The method further includes comparing the challenge request response to the verified challenge request response, wherein when the challenge request response and the verified challenge request response are equal, the active NFC host device has authenticated itself to the accessory device.

In one aspect, the method further includes receiving a counter challenge request from the active NFC host device via the wireless communication protocol. The method also includes combining the counter challenge request with the shared secret value using the one-way function to compute a counter challenge request seed. In addition, the method includes combining the counter challenge request seed with the private key to compute a counter challenge request response. The method also includes sending the counter challenge request response to the active NFC host device via the wireless communication protocol, wherein the counter challenge request response is used to authenticate the accessory device.

In one aspect, the wireless communication protocol is Bluetooth and the shared secret value is a computed Bluetooth simple secure pairing (SSP)numeric comparison code. In another aspect, the passive NFC tag is affixed to an exterior of the accessory device via an adhesive. In yet another aspect, the accessory device is a Bluetooth accessory device designed to pair with a public safety land mobile radio (LMR) device. In a further aspect, the accessory device is a wireless speaker microphone. In another aspect, an audio link is not established between the accessory device and the active NFC host device until the active NFC host device has authenticated itself to the accessory device and the accessory device has authenticated itself to the active NFC host device. In another aspect, any authentication failure indicates the NFC tag has been tampered with. In one aspect, the method further includes terminating the wireless communication protocol between the accessory device and the active NFC host device upon any authentication failure.

A device for secure pairing for devices with NFC tags equipped with authentication is provided. The device includes a processor. The device also includes a passive near field communication (NFC) tag providing authentication and containing an address for connecting to the device via a wireless communication protocol, the passive NFC tag including a private key known to the passive NFC tag and the processor, wherein the passive NFC tag is not electrically coupled to the processor. The device also includes a non-transitory processor readable medium containing a set of instructions thereon that when executed by the processor cause the processor to send a challenge request to an active NFC host device connected to the device via the wireless communication protocol. The instructions also cause the processor to combine the challenge request with a shared secret value known to the processor and the active NFC host device using a one-way function to compute a challenge request seed. The instructions also cause the processor to combine the challenge request seed with the private key to compute a verified challenge request response. The instructions also cause the processor to receive a challenge request response from the active NFC host device via the wireless communications protocol. The instructions also cause the processor to compare the challenge request response to the verified challenge request response, wherein when the challenge request response and the verified challenge request response are equal, the active NFC host device has authenticated itself to the device.

In one aspect, the instructions also cause the processor to receive a counter challenge request from the active NFC host device via the wireless communication protocol. The instructions also cause the processor to combine the counter challenge request with the shared secret value using the one-way function to compute a counter challenge request seed. The instructions also cause the processor to combine the counter challenge request seed with the private key to compute a counter challenge request response. The instructions also cause the processor to send the counter challenge request response to the active NFC host device via the wireless communication protocol, wherein the counter challenge request response is used to authenticate the device.

In one aspect, the wireless communication protocol is Bluetooth and the shared secret value is a computed Bluetooth simple secure pairing (SSP)numeric comparison code. In another aspect, the device is a Bluetooth accessory device and the active NFC host device is a public safety land mobile radio (LMR) device. In another aspect, the instructions cause the processor to terminate the wireless communication protocol between the device and the active NFC host device upon any authentication failure.

A device for secure pairing for devices with NFC tags equipped with authentication is provided. The device includes a processor. The device also includes an active near field communication (NFC) tag reader, wherein the active NFC tag reader performs two-way communication with a passive NFC tag. The device also includes a non-transitory processor readable medium containing a set of instructions thereon that when executed by the processor cause the processor to connect to an accessory device via a wireless communication protocol. The instructions also cause the processor to receive a challenge request from the accessory device via the wireless communication protocol. The instructions also cause the processor to combine the challenge request with a shared secret value known to the processor and the accessory device using a one-way function to compute a challenge request seed. The instructions also cause the processor to send the challenge request seed, via the active NFC tag reader, to the passive NFC tag, the passive NFC tag including authentication and a private key, wherein the private key is not known by the processor and is used to compute a challenge request response. The instructions also cause the processor to receive the challenge request response, via the active NFC tag reader, from the passive NFC tag. The instructions also cause the processor to send the challenge request response to the accessory device via the wireless communications protocol, wherein the challenge request response is used to authenticate the device.

In one aspect, the instructions also cause the processor to send a counter challenge request to the accessory device via the wireless communication protocol. The instructions also cause the processor to combine the counter challenge request with the shared secret value using the one-way function to compute a counter challenge request seed. The instructions also cause the processor to send the counter challenge request seed, via the active NFC tag reader, to the passive NFC tag, wherein the passive NFC tag uses the private key to compute a verified counter challenge response. The instructions also cause the processor to receive the verified counter challenge response, via the active NFC tag reader, from the passive NFC tag. The instructions also cause the processor to receive a counter challenge response from the accessory device via the wireless communication protocol. The instructions also cause the processor to compare the counter challenge response and the verified counter challenge response wherein when the counter challenge response and the verified counter challenge response are equal, the accessory device has authenticated itself to the device.

In one aspect, the wireless communication protocol is Bluetooth and the shared secret value is a computed Bluetooth simple secure pairing (SSP)numeric comparison code. In another aspect, the passive NFC tag is not electrically coupled to the accessory device. In another aspect, an audio link is not established between the device and the accessory device until the device has authenticated itself to the accessory device and the accessory device has authenticated itself to the device. The instructions also cause the processor to terminate the wireless communication protocol between the device and the accessory device upon any authentication failure.

FIG. 1 is an example of a high level system diagram for a system implementing the secure pairing techniques described herein. System 100 may include an accessory device 110 and a host device 150. The accessory device may be any type of accessory that is intended for pairing with a host device. For example, in a public safety context, an accessory device may include a device such as a wireless remote speaker microphone (RSM) or wireless remote video speaker microphone. An accessory device may include a wireless earpiece or a wireless camera. The systems and methods described herein are not limited to any particular type of accessory device, so long as it is an accessory device intended to wirelessly pair with a host device.

The accessory device may include a processor 112. The processor may be coupled to a non-transitory processor readable medium 120. The medium 120 may contain instructions thereon that when executed by the processor cause the processor to implement the techniques described herein. The instructions executed by the processor are described in further detail below. The processor may also be coupled to a memory 114. In some implementations, the processor causes the instructions stored on medium 120 to be loaded into memory 114 and the processor executes the instructions from the memory 114.

The accessory device may also include a wireless communication protocol transceiver 130. Wireless protocol transceiver 130 may be coupled to the processor 112. The processor may utilize wireless protocol transceiver 130 to communicate with other devices that have also implemented the same wireless communication protocol. For example, the wireless protocol transceiver 130 may implement the Bluetooth communication protocol and will thus allow the processor to establish a wireless link 195 with other devices that have implemented the Bluetooth communication protocol. Other wireless communications protocols (e.g. Wi-Fi, LTE, etc.) are suitable for use with the techniques described herein. What should be understood is that any two way wireless communications transceiver is suitable for use with the techniques described herein.

Accessory device 110 may also include a passive NFC tag 140 that includes authentication. NFC, or near field coupling, refers to communications occurring at distances close to an antenna ("near field") such that the signal power falls much more rapidly than the ratio of distance squared (as it would in the "far field" away from the antenna). A passive NFC tag is a NFC tag that is energized by the short-range electromagnetic field produced by an active NFC tag reader. The passive NFC tag is then able to send data to a device that hosts the active NFC tag reader as well as receive data from that host 190. The passive NFC tag may include a private key 142. The private key is a piece of data, such as that used in public/private key cryptography, that is known only by the passive NFC tag and the processor of the accessory device. The passive NFC tag may also include a connect address 144 which provides a connection address for connecting to the wireless communication protocol transceiver 130. Operation of this connection is described below.

What should be noted is that the passive NFC tag 140 is in no way electrically coupled to the processor. Thus, the processor cannot communicate electrically with the passive NFC tag. The processor additionally has no NFC reader hardware and as such can neither read nor write any data to the passive NFC tag. In one example implementation, the passive NFC tag may be in the form of a sticker that is affixed to an exterior of the accessory device via an adhesive. In other implementations, the passive NFC tag may be integrated with the accessory device. What should be understood though is that the processor 112 has no ability to access (read and/or write) the data stored on the passive NFC tag.

The accessory device also includes non-transitory processor readable medium 120. Medium 120 may store thereon a set of instructions that when executed by the processor cause the processor to implement the techniques described herein. For example, medium 120 may include NFC host device authentication instructions 121 that are used to authenticate a host device. Operation of NFC host device authentication instructions is described further below and with respect to FIG. 2, and FIG. 3 (e.g. blocks 310-330). Medium 120 may also include accessory device authentication instructions 122 which may be used to allow the host device to authenticate the accessory device 110. Operation of accessory device authentication instructions is described further below and with respect to FIG. 2, and FIG. 3 (e.g. blocks 335-350). Medium 120 may also include wireless protocol termination instructions 123. The wireless protocol termination instructions may be used to terminate the connection that utilizes the wireless communication protocol transceiver 130.

In addition, medium 120 may include private key 124. Private key 124 is the same private key as private key 142 that is stored in the passive NFC tag 140. As mentioned above, the processor 112 has no access to private key 142. However, the same private key is accessible by the processor via medium 120. The medium 120, or the portion of medium 120 storing the private key 124, may be subject to additional access controls such that the private key 124 cannot be directly read out of the medium 120. In some implementations, the private keys are stored on the medium 120 and the passive NFC tag 140 at the time accessory device 110 is manufactured. As will become more clear during the discussion of the operation of system 100, if the private key 124 stored on the medium 120 is not the same as the private key 142 stored on the passive NFC tag 140, that is an indication that either the medium 120 or the passive NFC tag 140 has been tampered with. Additionally, to prevent an exchange of components, the NFC sticker and/or device housing may be designed in a tamper-evident manner.

System 100 may also include a host device 150. The host device may be any type of device that is capable of pairing with an accessory device using a wireless communication protocol. For example, one type of host device may be a land mobile radio (LMR) walkie talkie used by public safety (e.g. police, fire, medical services) personnel. Another example of a host device may be a fixed position LMR device. The techniques described herein are not limited to any particular type of device, and any device including the features described below are suitable when using the techniques described herein.

Host device 150 may include a processor 152. The processor may be coupled to a non-transitory processor readable medium 160. The medium 160 may contain instructions thereon that when executed by the processor cause the processor to implement the techniques described herein. The instructions executed by the processor are described in further detail below. The processor may also be coupled to a memory 154. In some implementations, the processor causes the instructions stored on medium 160 to be loaded into memory 154 and the processor executes the instructions from the memory 154.

The host device 150 may also include a wireless communication protocol transceiver 170. The wireless communication protocol transceiver 170 is similar to wireless communication protocol transceiver 130. Wireless protocol transceiver 170 may be coupled to the processor 152. The processor may utilize wireless protocol transceiver 170 to communicate with other devices that have also implemented the same wireless communication protocol. For example, the wireless protocol transceiver 170 may implement the Bluetooth communication protocol and will thus allow the processor to establish a wireless link with other devices that have implemented the Bluetooth communication protocol. Other wireless communications protocols (e.g. Wi-Fi, LTE, etc.) are suitable for use with the techniques described herein. What should be understood is that any two-way wireless communications transceiver is suitable for use with the techniques described herein.

The host device 150 may also include active NFC tag reader 180. Active NFC tag reader 180 may be used to provide an electromagnetic field to energize a passive NFC tag (e.g. passive NFC tag 140). Once a passive NFC tag is energized, the host device may use the active NFC tag reader to read data from the host device. In addition, the active NFC tag reader can send data to the passive NFC tag. In other words, active NFC tag reader 180 is able to perform two-way communication with a passive NFC tag.

The host device 150 also includes non-transitory processor readable medium 160. Medium 160 may store thereon a set of instructions that when executed by the processor cause the processor to implement the techniques described herein. For example, medium 160 may include NFC host device authentication instructions 161 that are used to authenticate a host device. Operation of NFC host device authentication instructions is described further below and with respect to FIG. 2, and FIG. 4 (e.g. blocks 410-435). Medium 160 may also include accessory device authentication instructions 162 which may be used to allow the host device to authenticate the accessory device 110. Operation of accessory device authentication instructions is described further below and with respect to FIG. 2, and FIG. 4 (e.g. blocks 440-465). Medium 160 may also include wireless protocol termination instructions 163. The wireless protocol termination instructions may be used to terminate the connection that utilizes the wireless communication protocol transceiver 170.

In operation, host device 150 may desire to pair with accessory device 110 by using wireless communication protocol transceivers 130, 170. An initial communications channel 195 may be established between transceivers 130, 170 in order to execute the device authentication procedure described below. An initial step in creating the communication channel is for the host device 150 to learn the connection address of the accessory device. The host device 150 may utilize the active NFC tag reader 180 to read the connect address 144 from the passive NFC tag 140 over the NFC link 190. The connect address may be used to establish the initial wireless communication link.

For example, in the case where the wireless communication protocol is Bluetooth, the host device 150 may use the active NFC tag 180 to retrieve the Bluetooth address of the wireless communications transceiver 130. The host device may use wireless communication transceiver 170 to establish a wireless connection with the accessory device. For example, the host device and the accessory device may utilize Bluetooth simple secure pairing (SSP) procedures to establish the wireless link. It should be noted that as part of the SSP process, certain cryptographic keys are exchanged to create a link key that may then be used to ensure that communications over the wireless link are secure. Furthermore, as part of the SSP process, a numeric comparison code is computed by both ends of the connection. The same numeric comparison code will be generated by each endpoint, and will not be transmitted over the wireless link. Furthermore, if a Man-In-The-Middle (MITM) attack is attempted, the host device and accessory device will generate different numeric comparison codes. As such, absent an attempted man-in-the-middle attack, the numeric comparison code is a shared secret between the two endpoints. As will be described further below, the numeric comparison code is used in the authentication process as the shared secret data element.

Once the wireless connection is established, the host device 150 and the accessory device 110 may exchange messages over the wireless communication link in order to authenticate each other. The process of authentication is described in further detail below. If the authentication fails, the wireless communications link between the host device and the accessory device may be terminated.

Figure 2:
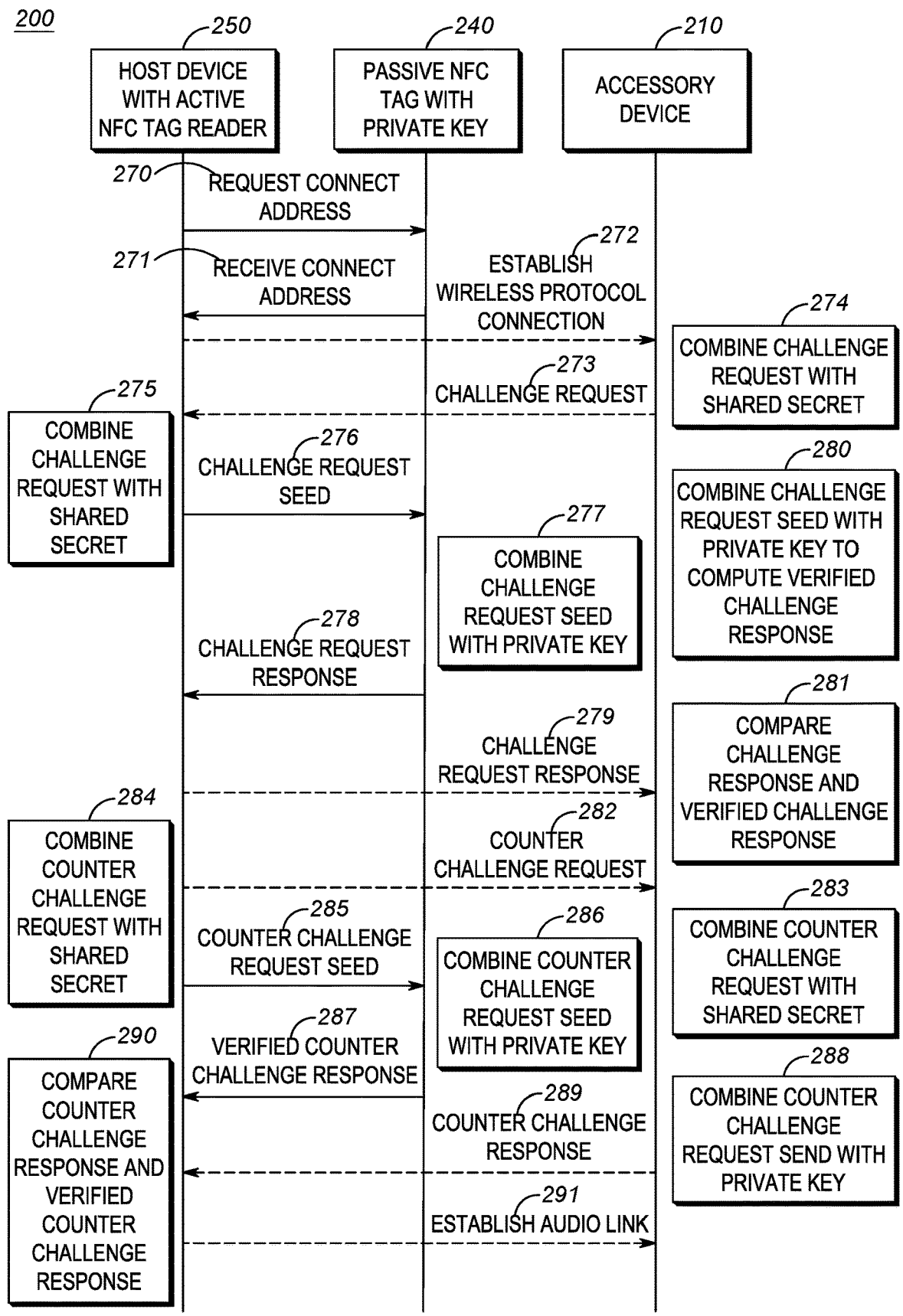
FIG. 2 is an example flow diagram of an end to end message flow for securing pairing of devices with NFC tags equipped with authentication according to the techniques described herein.

FIG. 2 is an example flow diagram of an end to end message flow for securing pairing of devices with NFC tags equipped with authentication according to the techniques described herein. Flow diagram 200 may include an accessory device 210, which may include a NFC passive tag with private key 240, and a host device with active NFC tag reader 250. Device 210 and 250, along with NFC tag 240 may be devices such as the similarly numbered devices (110, 140, and 150) described in FIG. 1.

For ease of description, communications shown with a solid line depict communications between devices using the active NFC tag reader and passive NFC tag and will be referred to as sending a message over NFC. Communications shown with a dashed line depict communications between devices using the wireless communication protocol transceiver and will be referred to as sending a message over the wireless link. It should be understood that both communications are wireless and the difference in terminology is merely for ease of description of which link is utilized, and is not intended to be limiting.

The host device 250 may request a connection address by sending a request connect address 270 over NFC. For example, in the case where Bluetooth is the wireless communication protocol, the connect address may be the Bluetooth address of the accessory device. The Bluetooth address may be stored in the passive NFC tag 240, as described with reference to FIG. 1. The active NFC tag may energize the passive NFC tag in order to retrieve the connect address from the passive NFC tag. In response, the passive NFC tag 240 may respond with the connect address over NFC. As shown, the host device 250 may receive the connect address 271 over NFC.

The wireless connection protocol 272 may be established. For example, in the case of a Bluetooth wireless connection protocol, the connection may be established by exchanging SSP keys and generating a local numeric comparison code values on the host device 250 and the accessory device 210. It should be understood that using Bluetooth SSP, the generated numeric comparison code is never transmitted over the air, but rather is calculated. As such, the numeric comparison code value is a secret value shared between the host device and accessory device and is not known, nor can it be easily derived, by any other entity. Furthermore, it should be noted that the numeric comparison code may be part of the Bluetooth protocol that is used to establish secure link keys known by the host and accessory devices. Those link keys may be used to encrypt traffic between the host and the accessory device over the wireless link. As such, all communication over the wireless link may be considered secure and cannot be easily intercepted and decoded by a third party not participating in key establishment.

Although establishing the wireless connection has been described in terms of Bluetooth, it should be understood that the techniques described herein are not so limited. Any wireless communication protocol that provides for a securely generated shared secret between communications endpoints would be equally suitable. What should be understood is that there exists a shared secret value between the host device 250 and the accessory device 210 that cannot be read or shared by a potential man-in-the-middle attacker.

The accessory device 210 may generate a challenge request message 273 and send the message to the host device 250 over the wireless link. The challenge request message may be any type of value that can be generated by the accessory device. For example, the challenge request message may be a numeric or alphanumeric message. The accessory device may combine 274 the challenge request with the shared secret data known by the accessory device and the host device in order to compute a challenge request seed. For example, in the case of Bluetooth, the shared secret data may be the numeric comparison code.

The host device may receive the challenge request 273 and also combine 275 the challenge request with the shared secret to produce a challenge request seed. The challenge request seed may then be sent 276 to the passive NFC tag over NFC. It should be noted that the combination of the challenge request and the shared secret value may utilize any type of one-way function. A one-way function may have the characteristic that it is very easy to compute the result (e.g. the challenge request seed) from the operands (e.g. the challenge request and the shared secret value) but is very difficult, if not impossible, to recover the operands (e.g. the shared secret value) even if the result (e.g. the challenge request) and the other operands (e.g. the challenge request) are known. Thus, even though the challenge request and challenge request seed may be sent over a link that may be intercepted, the shared secret value cannot be recovered.

The passive NFC tag may combine the challenge request seed with the private key in order to compute the challenge request response 277, which may be sent to the host device 250 over NFC. As mentioned above, the private key is not known by the host device. Furthermore, the combination may also utilize a one-way function, such that the host device, or any eavesdroppers, cannot recover the private key even if the challenge request seed and the result of the combination are known. The challenge request response may be sent 278 to the host device over NFC. The host device may then send 279 the challenge request response computed by the NFC tag to the accessory device over the wireless link.

In addition, the accessory device 210 may combine 280 the result of the combination of the challenge request and shared secret data 274 with the private key to compute a verified challenge response. As above, the combination may use a one-way function. As mentioned above, the private key is known to the passive NFC tag and the accessory device, even though the passive NFC tag is not communicatively coupled to the accessory device processor. The accessory device may then compare 281 the challenge request response 279 to the verified challenge request response 280 to determine if they are equal. If so, the accessory device 210 is assured that the host device 250 not only knows the shared secret data but is also in communication with an NFC tag 240 that knows the private key associated with the accessory device. As such, the host device can be considered authenticated by the accessory device. However, if a Man In The Middle is present, the numeric comparison codes generated by the host device and the accessory device will differ, and the attacker cannot provide correct responses to the challenges as it does not have access to the private key required to generate the correct challenge request response 279.

At this point, the accessory device 210 has authenticated that the host device 250. However, the host device has not yet authenticated the accessory device. For example, the accessory device could indicate the comparison 281 was successful, even if it was not (e.g. the accessory devices could fraudulently claim the comparison was a success). In other words, the host device cannot be assured that the accessory device knows the private key known to the passive NFC tag 240. In order to provide the assurance that the accessory device is in possession of the same private key as the passive NFC tag, the authentication process described above may be reversed, as is described below. Although not explicitly mentioned below, it should be understood that all combinations involving the shared secret data or private key are performed using one-way functions, just as was described above.

The host device 250 may generate a counter challenge request 282 and send it to the accessory device 210 over the wireless link. The counter challenge request 282 may be similar to the challenge request, with the exception that it is generated by the host device instead of the accessory device. Upon receipt, the accessory device may combine the counter challenge request with the shared secret data 283 to compute the counter challenge request seed. The same process may occur on the host device, where the host device may combine 284 the counter challenge request with the shared secret data to compute the counter challenge request seed.

The host device 250 may then send the counter challenge request seed over NFC 285 to the passive NFC tag 240. The passive NFC tag may combine the counter challenge request seed with the private key 286 to produce a verified counter challenge response. The verified counter challenge response may then be sent to the host device over NFC 287. The accessory device 210 may then combine 288 the counter challenge request seed produced by the combination 283 of the counter challenge request and shared secret data with the private key to produce a counter challenge response. The accessory device may then send 289 the counter challenge response to the host device 250.

The host device 250 may receive the counter challenge response 289 and compare it with the verified counter challenge response 290. If the two responses are equal, then this is an indication that the accessory device 210 is in possession of both the shared secret data as well as the private key. As such, the accessory device can be considered as having authenticated itself to the host device. Once again, if a Man In The Middle attacker is present, it would not have access to the private key required to generate the correct counter challenge response and the authentication step will fail.

If the accessory device 210 is able to authenticate itself to the host device 250, and the host device is able to authenticate itself to the accessory device, a next level of connection may be established between the host device and the accessory device. For example, in the case of a Bluetooth remote accessory device, such as a remote speaker microphone, an audio link between the two devices may be established 291. Although an audio link is an example of a next level of connection, it should be understood that the techniques described herein are not so limited. What should be understood is that once the host and accessory devices have authenticated each other, communications may proceed over the wireless link using whatever functionality is provided by each of those devices.

In the case where either the authentication of the host device 250 or the accessory device 210 fails, the connection can be terminated. For example, as mentioned above, the wireless link 272 is established in order to securely exchange messages (e.g. challenge request, challenge request response, etc.) between the host device and the accessory device. If the authentication fails, that connection may be terminated. Likewise, if a next level connection has been established (e.g. an audio link as already been established), the next level connection could be terminated.

Figure 3:
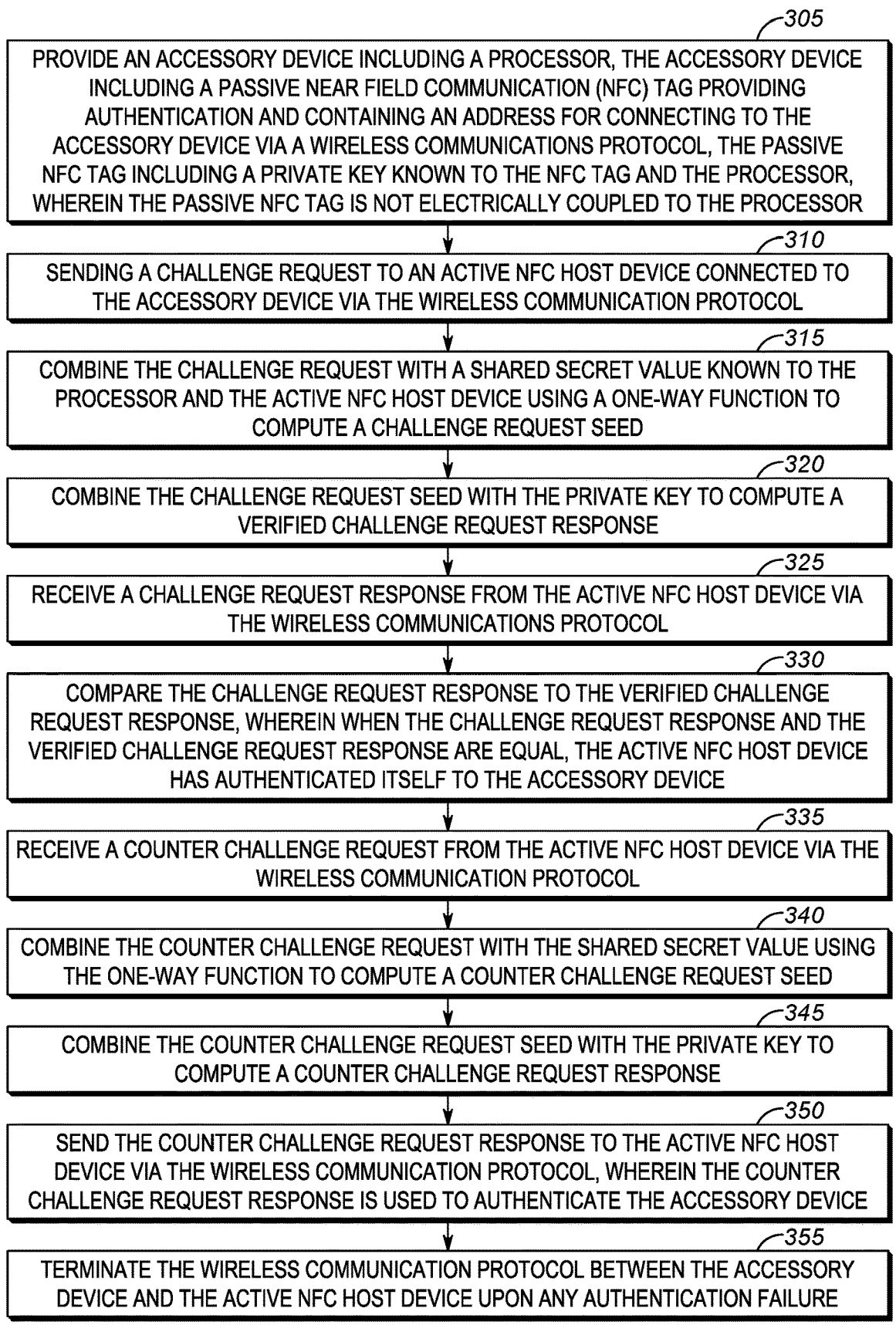
FIG. 3 is an example of a flow diagram for pairing an accessory device including an NFC tag equipped with authentication with a NFC host device, according to the techniques described herein.

FIG. 3 is an example of a flow diagram for pairing an accessory device including a passive NFC tag equipped with authentication with a NFC host device, according to the techniques described herein. In block 305, an accessory device including a processor may be provided. The accessory device may also include a passive NFC tag providing authentication and containing an address for connecting to the accessory device via a wireless communications protocol. The passive NFC tag may include a private key known to the passive NFC tag and the processor. The passive NFC tag may not be electrically coupled to the processor. An example of a block diagram of such a device is shown in FIG. 5.

In block 310, a challenge request may be sent to an active host device connected to the accessory device via the wireless communications protocol. In one example implementation, the wireless communication protocol may be Bluetooth, however techniques described herein are not limited to communication using any specific protocol. In block 315, the challenge request may be combined with a shared secret value known to the processor and the active NFC host device using a one-way hash function to compute a challenge request seed. As explained above, the shared secret value may be a value that is never transmitted over the wireless communication protocol and is thus not subject to interception by a bad actor that is monitoring the wireless communication protocol. In one implementation, the shared secret value is a Bluetooth SSP numeric comparison code.

Use of a one-way function ensures that the shared secret value cannot be recovered from the challenge request seed.

In block 320, the challenge request seed may be combined with the private key to compute a verified challenge request response. As mentioned above, the private key may be independently known by the processor and the passive NFC tag. There may be no electrical connection between the processor and the passive NFC tag, thus preventing any direct communication between the processor and the passive NFC tag. In one example, the private key may be programmed into the passive NFC tag and a memory associated with the processor at the time of manufacturing of the accessory device.

In block 325, a challenge request response may be received from the active NFC host via the wireless communication protocol. The process of computing the challenge request response is described in further detail in FIG. 4. In block 330, the challenge request response may be compared to the verified challenge request response, wherein when the challenge request response and the verified challenge request response are equal, the active NFC host has authenticated itself to the accessory device. As explained above, when the challenge request response is equal to the verified challenge request response, it is confirmed that the active NFC host is in communication with the passive NFC tag that includes the same private key as contained by the processor, thus proving that the active NFC host is communicating with the same passive NFC tag that was present when the accessory device was manufactured.

In block 335, a counter challenge may be received form the active NFC host device via the wireless communication protocol. The process of computing the counter challenge response is described in further detail with respect to FIG. 4. In block 340, the counter challenge request may be combined with the shared secret value using the one-way function to compute a counter challenge request seed. As above, the use of a one-way function ensures that the shared secret value cannot be recovered, even if the counter challenge request seed and the challenge request are known. In block 345, the counter challenge request seed may be combined with the private key to compute a counter challenge request response. As above, because the private key is known only to the passive NFC tag and the processor, those are the only two entities that are capable of computing the same counter challenge request response when given the same counter challenge request seed.

In block 350, the counter challenge request response may be sent to the active NFC host device via the wireless communication protocol. The counter challenge request response may be used to authenticate the accessory device, as will be described in further detail with respect to FIG. 4. In block 355, the wireless communication protocol between the accessory device and the active NFC host device may be terminated upon any authentication failure. As described above, any authentication failure may indicate that the passive NFC tag associated with the accessory device has been tampered with in some way (e.g. data alteration, tag substitution, etc.) thus any pairing with such an accessory device is not secure. Alternatively, it may indicate that a Man In The Middle is attempting to eavesdrop on the link. In either case, terminating the wireless communication protocol may include completely disconnecting the active NFC host device from the accessory device. For example, in the case of a Bluetooth link, terminating the wireless communication protocol may include disconnecting the Bluetooth link.

As another example, terminating the wireless communication protocol may include not establishing an audio link between the accessory device and the active NFC host device until the active NFC host device has authenticated itself to the accessory device and the accessory device has authenticated itself to the active NFC host device. In one example, the accessory device may be a Bluetooth accessory device (e.g. a wireless speaker microphone, wireless camera speaker microphone, etc.) designed to pair with a public safety LMR device. In a case where authentication of either the NFC host device or the accessory device fails, an audio link may not be established.

Figure 4:
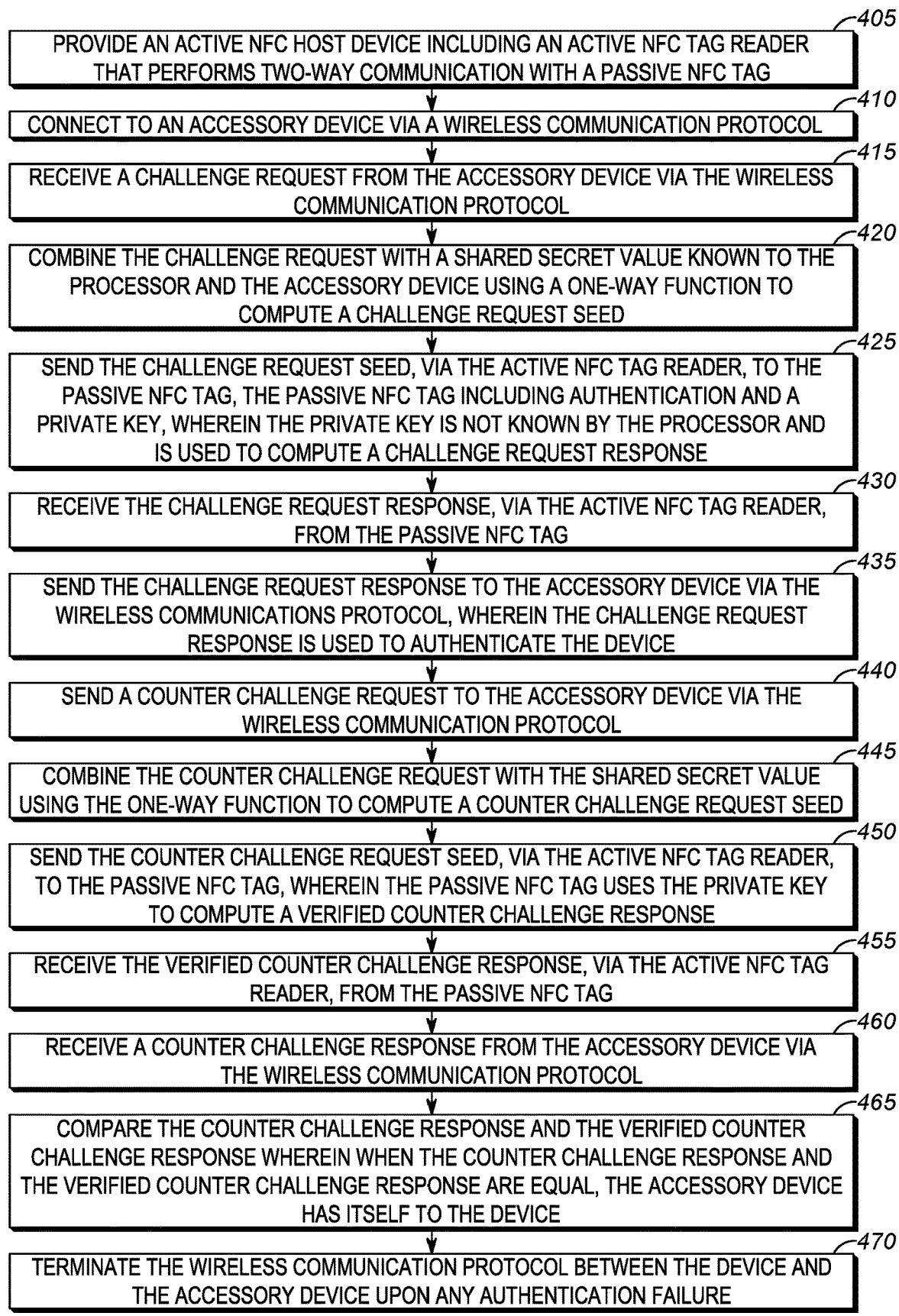
FIG. 4 is an example of a flow diagram for pairing a device with an accessory device including an NFC tag equipped with authentication, according to techniques described herein.

FIG. 4 is an example of a flow diagram for pairing a device with an accessory device including a NFC tag equipped with authentication, according to techniques described herein. In block 405, an active NFC host device including a processor may be provided. The active NFC host device may include an active NFC tag reader that performs two-way communication with a passive NFC tag. In block 410, the device may connect to an accessory device via a wireless communication protocol. For example, the device may use the active NFC tag to read a connection address from a passive NFC tag associated with an accessory device. For example, the device may connect to the accessory device via the Bluetooth wireless communication protocol and the passive NFC tag may include a Bluetooth address.

In block 415, a challenge request may be received from the accessory device via the wireless communication protocol. In block 420, the challenge request may be combined with the shared secret value known to the processor and the accessory device using a one-way function to compute a challenge request seed. As explained above, use of a one-way function prevents recovery of the shared secret value, even if the challenge request and the challenge request seed are known. In one example implementation, the shared secret value may be a Bluetooth SSP numeric comparison code.

In block 425, the challenge request seed may be sent, via the active NFC tag reader, to the passive NFC tag, the passive NFC tag including authentication and a private key. The private key is not known by the host processor. The private key may be used to compute a challenge request response. In block 430, the challenge request response may be received, via the active NFC tag reader, from the passive NFC tag. As explained above, the host processor does not have access to the private key. Thus, the challenge request response cannot be computed by the processor.

In block 435, the challenge request response may be sent to the accessory device via the wireless communication protocol. The challenge request response may be used to authenticate the device. As explained above, the private key is not known by the processor. Thus, successful computation of the challenge request response can only be done by a passive NFC tag which includes the private key. Further description to the authentication process was provided above with respect to FIG. 3.

In block 440 a counter challenge may be sent to the accessory device via the wireless communication protocol. In block 445, the counter challenge request may be combined with the shared secret value to compute a counter challenge request seed. Just as above, the combination of the shared secret value and the counter challenge request may use a one-way function. The use of the one-way function prevents recovery of the shared secret value even if the counter challenge request and the counter challenge request seed are known.

In block 450, the counter challenge request seed may be sent, via the active NFC tag reader, to the passive NFC tag. The passive NFC tag may use the private key to compute a verified counter challenge response. As explained above, only the passive NFC tag and the processor on the accessory device know the private key. Thus, those are the only two devices capable of computing matching counter challenge responses from a given counter challenge request seed. In block 455, the verified counter challenge response may be received from the passive NFC tag, via the active NFC tag reader.

In block 460, a counter challenge response may be received from the accessory device via the wireless communication protocol. In block 465, the counter challenge response and the verified counter challenge response may be compared. When the counter challenge response and the verified counter challenge response are equal, the accessory device has authenticated itself to the device.

In block 470, the wireless communication protocol between the accessory device and the device may be terminated upon any authentication failure. As described above, any authentication failure may indicate that the passive NFC tag associated with the accessory device has been tampered with in some way (e.g. data alteration, tag substitution, etc.), or that a Man In The Middle attack is being attempted. In either case, any pairing with such an accessory device is not secure. Terminating the wireless communication protocol may include completely disconnecting the device from the accessory device. For example, in the case of a Bluetooth link, terminating the wireless communication protocol may include disconnecting the Bluetooth link.

As another example, terminating the wireless communication protocol may include not establishing an audio link between the accessory device and the device until the device has authenticated itself to the accessory device and the accessory device has authenticated itself to the device. In one example, the device may be a public safety LMR device designed to pair with a Bluetooth accessory device (e.g. a wireless speaker microphone, wireless camera speaker microphone, etc.). In a case where authentication of either the device or the accessory device fails, an audio link may not be established.

END

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:
1. A method comprising:
providing an accessory device including a processor, the accessory device including a passive near field communication (NFC) tag providing authentication and containing an address for connecting to the accessory device via a wireless communications protocol, the passive NFC tag including a private key known to the passive NFC tag and the processor, wherein the passive NFC tag is not electrically coupled to the processor;
sending, by the accessory device, a challenge request to an active NFC host device connected to the accessory device via the wireless communication protocol;
combining, by the accessory device, the challenge request with a shared secret value known to the processor and the active NFC host device using a one-way function to compute a challenge request seed;
combining, by the accessory device, the challenge request seed with the private key to compute a verified challenge request response;
receiving, by the accessory device, a challenge request response from the active NFC host device via the wireless communications protocol; and
comparing, by the accessory device, the challenge request response to the verified challenge request response, wherein when the challenge request response and the verified challenge request response are equal, the active NFC host device has authenticated itself to the accessory device.
2. The method of claim 1 further comprising:
receiving a counter challenge request from the active NFC host device via the wireless communication protocol;
combining the counter challenge request with the shared secret value using the one-way function to compute a counter challenge request seed;
combining the counter challenge request seed with the private key to compute a counter challenge request response; and
sending the counter challenge request response to the active NFC host device via the wireless communication protocol, wherein the counter challenge request response is used to authenticate the accessory device.
3. The method of claim 1 wherein the wireless communication protocol is Bluetooth and the shared secret value is a computed Bluetooth simple secure pairing (SSP) numeric comparison code.
4. The method of claim 1 wherein the passive NFC tag is affixed to an exterior of the accessory device via an adhesive.
5. The method of claim 1 wherein the accessory device is a Bluetooth accessory device designed to pair with a public safety land mobile radio (LMR) device.
6. The method of claim 1 wherein the accessory device is a wireless speaker microphone.
7. The method of claim 2 wherein an audio link is not established between the accessory device and the active NFC host device until the active NFC host device has authenticated itself to the accessory device and the accessory device has authenticated itself to the active NFC host device.

8. The method of claim 2 wherein any authentication failure indicates the passive NFC tag has been tampered with.

9. The method of claim 2 further comprising:
terminating the wireless communication protocol between the accessory device and the active NFC host device upon any authentication failure.

10. A device comprising:
a processor;
a passive near field communication (NFC) tag providing authentication and containing an address for connecting to the device via a wireless communication protocol, the passive NFC tag including a private key known to the passive NFC tag and the processor, wherein the passive NFC tag is not electrically coupled to the processor; and
a non-transitory processor readable medium containing a set of instructions thereon that when executed by the processor cause the processor to:
send a challenge request to an active NFC host device connected to the device via the wireless communication protocol;
combine the challenge request with a shared secret value known to the processor and the active NFC host device using a one-way function to compute a challenge request seed;
combine the challenge request seed with the private key to compute a verified challenge request response;
receive a challenge request response from the active NFC host device via the wireless communications protocol; and
compare the challenge request response to the verified challenge request response, wherein when the challenge request response and the verified challenge request response are equal, the active NFC host device has authenticated itself to the device.

11. The device of claim 10 wherein the medium further comprises instructions that cause the processor to:
receive a counter challenge request from the active NFC host device via the wireless communication protocol;
combine the counter challenge request with the shared secret value using the one-way function to compute a counter challenge request seed;
combine the counter challenge request seed with the private key to compute a counter challenge request response; and
send the counter challenge request response to the active NFC host device via the wireless communication protocol, wherein the counter challenge request response is used to authenticate the device.

12. The device of claim 10 wherein the wireless communication protocol is Bluetooth and the shared secret value is a computed Bluetooth simple secure pairing (SSP) numeric comparison code.

13. The device of claim 10 wherein the device is a Bluetooth accessory device and the active NFC host device is a public safety land mobile radio (LMR) device.

14. The device of claim 11 wherein the medium further comprises instructions that cause the processor to:
terminate the wireless communication protocol between the device and the active NFC host device upon any authentication failure.

15. A device comprising:
a processor;
an active near field communication (NFC) tag reader, wherein the active NFC tag reader performs two-way communication with a passive NFC tag; and
a non-transitory processor readable medium containing a set of instructions thereon that when executed by the processor cause the processor to:
connect to an accessory device via a wireless communication protocol;
receive a challenge request from the accessory device via the wireless communication protocol;
combine the challenge request with a shared secret value known to the processor and the accessory device using a one-way function to compute a challenge request seed;
send the challenge request seed, via the active NFC tag reader, to the passive NFC tag, the passive NFC tag including authentication and a private key, wherein the private key is not known by the processor and is used to compute a challenge request response;
receive the challenge request response, via the active NFC tag reader, from the passive NFC tag; and
send the challenge request response to the accessory device via the wireless communications protocol, wherein the challenge request response is used to authenticate the device.

16. The device of claim 15 wherein the medium further comprises instructions that cause the processor to:
send a counter challenge request to the accessory device via the wireless communication protocol;
combine the counter challenge request with the shared secret value using the one-way function to compute a counter challenge request seed;
send the counter challenge request seed, via the active NFC tag reader, to the passive NFC tag, wherein the passive NFC tag uses the private key to compute a verified counter challenge response;
receive the verified counter challenge response, via the active NFC tag reader, from the passive NFC tag;
receive a counter challenge response from the accessory device via the wireless communication protocol; and
compare the counter challenge response and the verified counter challenge response wherein when the counter challenge response and the verified counter challenge response are equal, the accessory device has authenticated itself to the device.

17. The device of claim 15 wherein the wireless communication protocol is Bluetooth and the shared secret value is a computed Bluetooth simple secure pairing (SSP) numeric comparison code.

18. The device of claim 15 wherein the passive NFC tag is not electrically coupled to the accessory device.

19. The device of claim 16 wherein an audio link is not established between the device and the accessory device until the device has authenticated itself to the accessory device and the accessory device has authenticated itself to the device.

20. The device of claim 16 wherein the medium further comprises instructions that cause the processor to:
terminate the wireless communication protocol between the device and the accessory device upon any authentication failure.

* * * * *